United States Patent
Kim

(10) Patent No.: US 12,162,383 B2
(45) Date of Patent: Dec. 10, 2024

(54) BRAKE DEVICE FOR POWER SWIVEL SEAT

(71) Applicant: DAS CO., LTD, Gyeongju-si (KR)

(72) Inventor: Jae Ho Kim, Suwon-si (KR)

(73) Assignee: DAS CO., LTD., Gyeongju-si (KR)

( * ) Notice: Subject to any disclaimer, the term of this patent is extended or adjusted under 35 U.S.C. 154(b) by 78 days.

(21) Appl. No.: 18/077,706

(22) Filed: Dec. 8, 2022

(65) Prior Publication Data

US 2023/0191958 A1   Jun. 22, 2023

(30) Foreign Application Priority Data

Dec. 21, 2021   (KR) ........................ 10-2021-0183554

(51) Int. Cl.
*B60N 2/14* (2006.01)
*B60N 2/02* (2006.01)

(52) U.S. Cl.
CPC ......... *B60N 2/146* (2013.01); *B60N 2/02246* (2023.08); *B60N 2/02253* (2023.08)

(58) Field of Classification Search
CPC . B60N 2/146; B60N 2/02246; B60N 2/02253
See application file for complete search history.

(56) References Cited

U.S. PATENT DOCUMENTS

| | | | |
|---|---|---|---|
| 5,046,995 A * | 9/1991 | Russell | F16H 29/12 475/170 |
| 9,211,812 B2 * | 12/2015 | Haller | B60N 2/508 |
| 9,227,529 B2 * | 1/2016 | Haller | B60N 2/062 |
| 9,579,995 B2 * | 2/2017 | Haller | B60N 2/16 |
| 9,663,001 B2 * | 5/2017 | Haller | B60N 2/146 |
| 10,807,504 B2 * | 10/2020 | Line | B60N 2/0292 |
| 2010/0102611 A1 * | 4/2010 | Bunea | B60N 2/146 297/344.22 |
| 2022/0348114 A1 * | 11/2022 | Lee | B60N 2/02246 |

FOREIGN PATENT DOCUMENTS

| | | |
|---|---|---|
| CN | 110901479 A | 3/2020 |
| DE | 102018211699 A1 | 1/2020 |

OTHER PUBLICATIONS

KR Office Action for corresponding KR Application No. 10-2021-0183554, dated Aug. 30, 2023, pp. 1-4.
DE Office Action for corresponding DE Application No. 102022213465.6, dated Sep. 26, 2023, pp. 1-7.

* cited by examiner

*Primary Examiner* — Mark R Wendell
(74) *Attorney, Agent, or Firm* — Tarolli, Sundheim, Covell & Tummino LLP

(57) ABSTRACT

The present disclosure relates to the brake device of the power swivel seat that ensures to have no clearance in the rotational direction during operation of the swivel seat, resulting in improved stability of the operation, and minimized generation of operating noise. Disclosed is a brake device of a power swivel seat including: a brake ring connected to a swivel fixing part; a brake wedge connected to a swivel rotating part; a brake roller and a brake spring installed in a wedge space formed between an inner circumferential surface of the brake ring and an outer circumferential surface of the brake wedge; and an unlocking block installed to rotate the brake wedge in a direction allowing to release lock caused by the brake roller in the wedge space.

7 Claims, 7 Drawing Sheets

BRAKE DEVICE FOR POWER SWIVEL SEAT

CROSS REFERENCE TO RELATED APPLICATION

The present application claims priority to Korea Patent Application No. 10-2021-0183554, filed Dec. 21, 2021, the entire contents of which is incorporated herein for all purposes by this reference.

TECHNICAL FIELD

The present disclosure relates to a brake device for a power swivel seat, and more particularly, to a brake device for a power swivel seat capable of improving stability of operation and constraining generation of operating noise by not allowing any clearance in a rotational direction during operation of the swivel seat.

BACKGROUND ART

With the improvement of eco-friendly, smart, and autonomous driving technologies, the trend of vehicle seats is also changing so that various activities besides driving can be performed. In particular, a demand for convenience for arranging a free space by rotating seats to create a comfortable interior space of the vehicle is emerging, and the swivel seat has been developed against such backdrop.

In addition, there is inconvenience of operation when a user manually rotates a swivel seat inside a vehicle, so usability and convenience is reduced. Thus, there is a growing demand for developing a power-driven swivel seat that allows a user to rotate the seat to a desired position before or after getting on the vehicle.

However, in a power driving device of the conventional swivel seat, a pinion gear on an input side is installed in a motor, and a ring gear on an output side is assembled on a swivel rotating plate. Thus, there is a problem in that excessive flow and noise in a rotational direction is generated respectively due to a backlash phenomenon between gear teeth, since an assembly of each gear is affected by dimensional accuracy of connecting components.

In particular, a clearance between the pinion gear on the input-side and the ring gear on the output-side, which is generated according to action of external vibration and a load applied to the swivel seat, acts as a major constraint in providing a comfortable feeling of seating.

DOCUMENT OF RELATED ART

Patent Document

Korean Patent No. 10-1944078

DISCLOSURE

Technical Problem

The technical problem to be solved by the present disclosure is to provide a brake device for a power swivel seat capable of improving stability of operation and constraining generation of operating noise by not allowing a clearance in a rotational direction when the swivel seat is operated.

Technical Solution

One embodiment is a brake device of a power swivel seat including: a brake ring connected to a swivel fixing part; a brake wedge connected to a swivel rotating part; a brake roller and a brake spring installed in a wedge space formed between an inner circumferential surface of the brake ring and an outer circumferential surface of the brake wedge; and an unlocking block installed to rotate the brake wedge in a direction allowing to release lock caused by the brake roller in the wedge space.

In the embodiment of the present disclosure, the brake device of a power swivel may further include: a worm shaft receiving rotation torque from a driving motor for rotation of the unlocking block; and a worm wheel reducing and transferring rotational speed provided by the driving motor between the worm shaft and the unlocking block.

In the embodiment of the present disclosure, the worm wheel may include a pinion gear capable of tooth engagement with a driving gear portion of the unlocking block, and the worm wheel and the pinion gear may be installed coaxially with respect to a shaft member.

In the embodiment of the present disclosure, the unlocking block may include: a driving protrusion extending in an axial direction toward a wedge space between the brake wedge and the brake ring and integrally formed with the driving gear portion.

In the embodiment of the present disclosure, the brake wedge may include: an inclined surface portion formed on an outer circumferential surface thereof to be contactable with or non-contactable with the brake roller; and a driven protrusion formed to be contactable with the driving protrusion.

In the embodiment of the present disclosure, the inclined surface portion may include: a contact surface portion making contact with the brake roller to restrict rotation of the brake wedge; and a non-contact surface portion making non-contact with the brake roller to allow rotation of the brake wedge.

In the embodiment of the present disclosure, the brake ring may be configured to form a wedge space between the inner circumferential surface of the brake ring and the outer circumferential surface of the brake wedge.

In the embodiment of the present disclosure, the brake device of a power swivel may further include: a housing installed under the unlocking block, and the housing may be configured to accommodate the worm shaft, the worm wheel, the unlocking block, the brake wedge, the brake ring, the brake roller, and the brake spring therein.

Advantageous Effect

The brake device of the power swivel seat according to the embodiment of the present disclosure may reduce total weight of the swivel seat and may greatly reduce cost for manufacturing the swivel seat by applying a structure including a reduction mechanism to a brake unit restricting or allowing rotational force provided to an unlocking block from a driving unit so as to release lock caused by a brake roller installed in a wedge space between a brake wedge and a brake ring.

In addition, in the brake device of the power swivel seat according to the embodiment of the present disclosure, there is no clearance in the rotational direction when the swivel seat is operated, so that not only can the stability of the operation be improved, but also the generation of operating noise can be constrained.

DETAILED DESCRIPTION

Hereinafter, embodiments of the present disclosure will be described in further detail with reference to the accompanying drawings.

Figure 1:
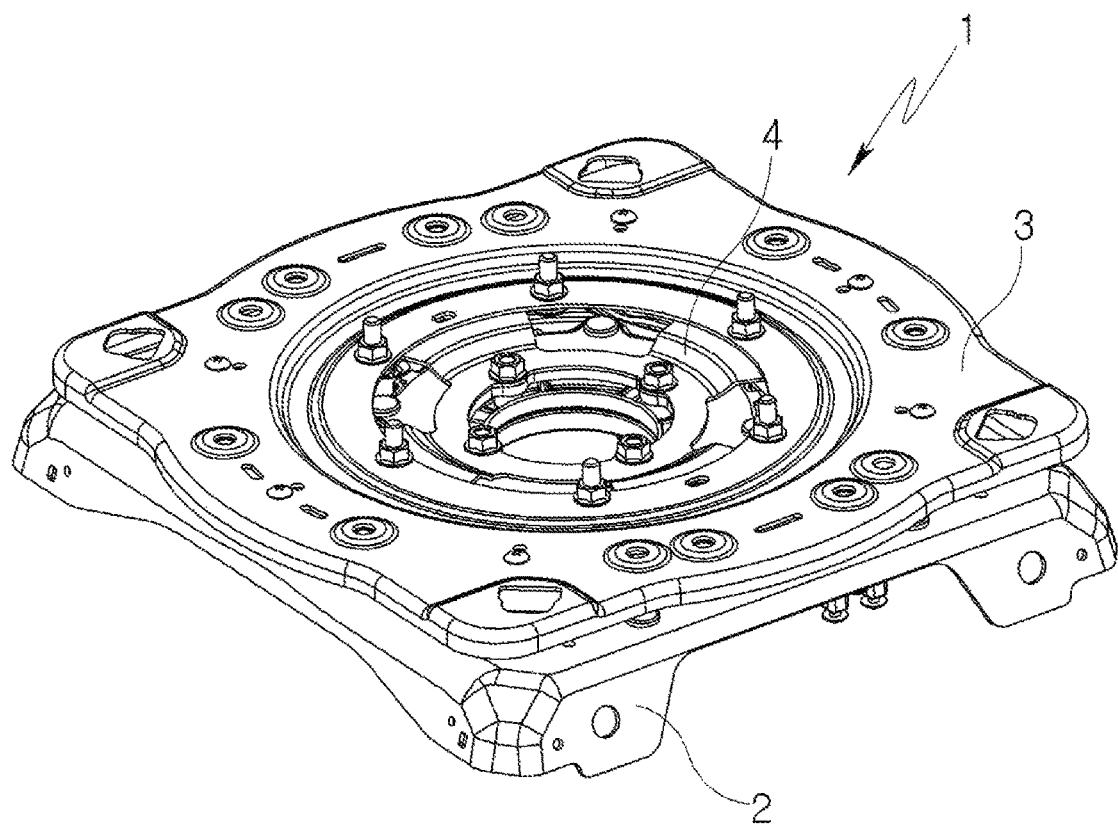
FIG. 1 is a perspective view illustrating a configuration of a brake device for a power swivel seat according to an embodiment of the present disclosure.
Figure 2:
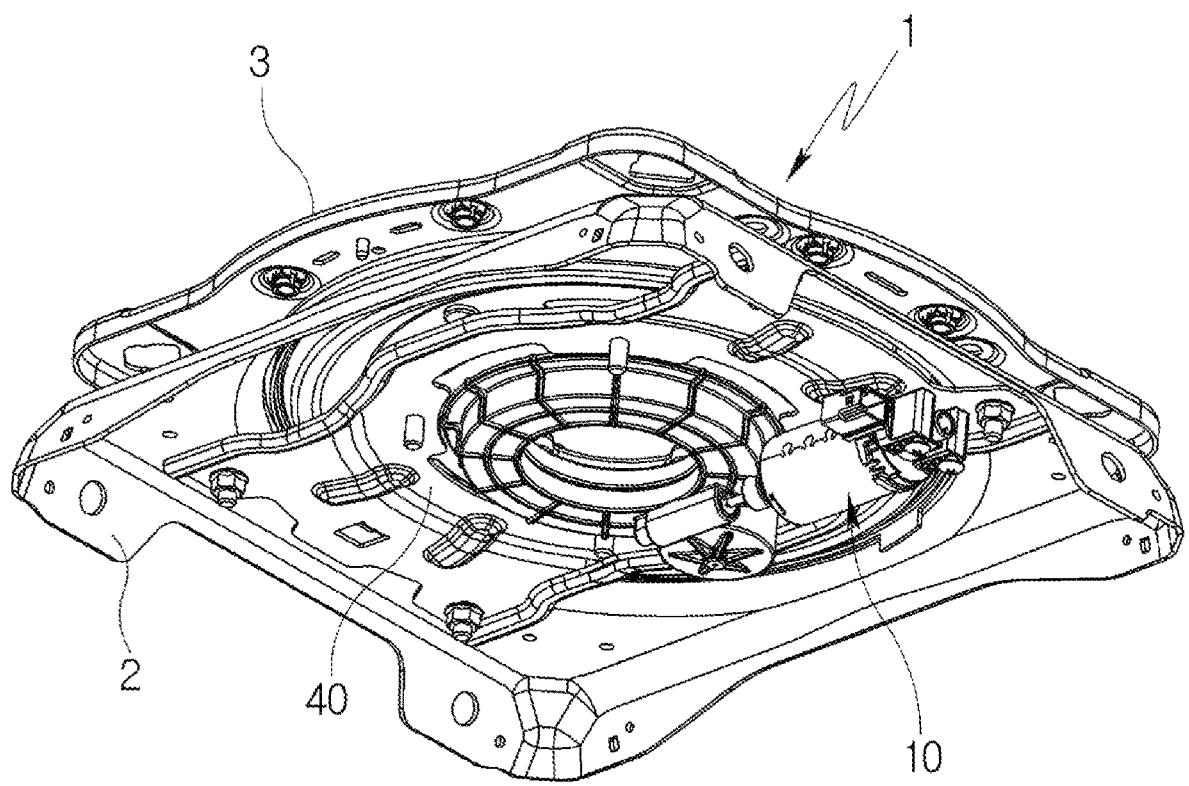
FIG. 2 is a perspective view illustrating the configuration of the brake device of the power swivel seat according to the embodiment of the present disclosure when viewed from the bottom.
Figure 3:
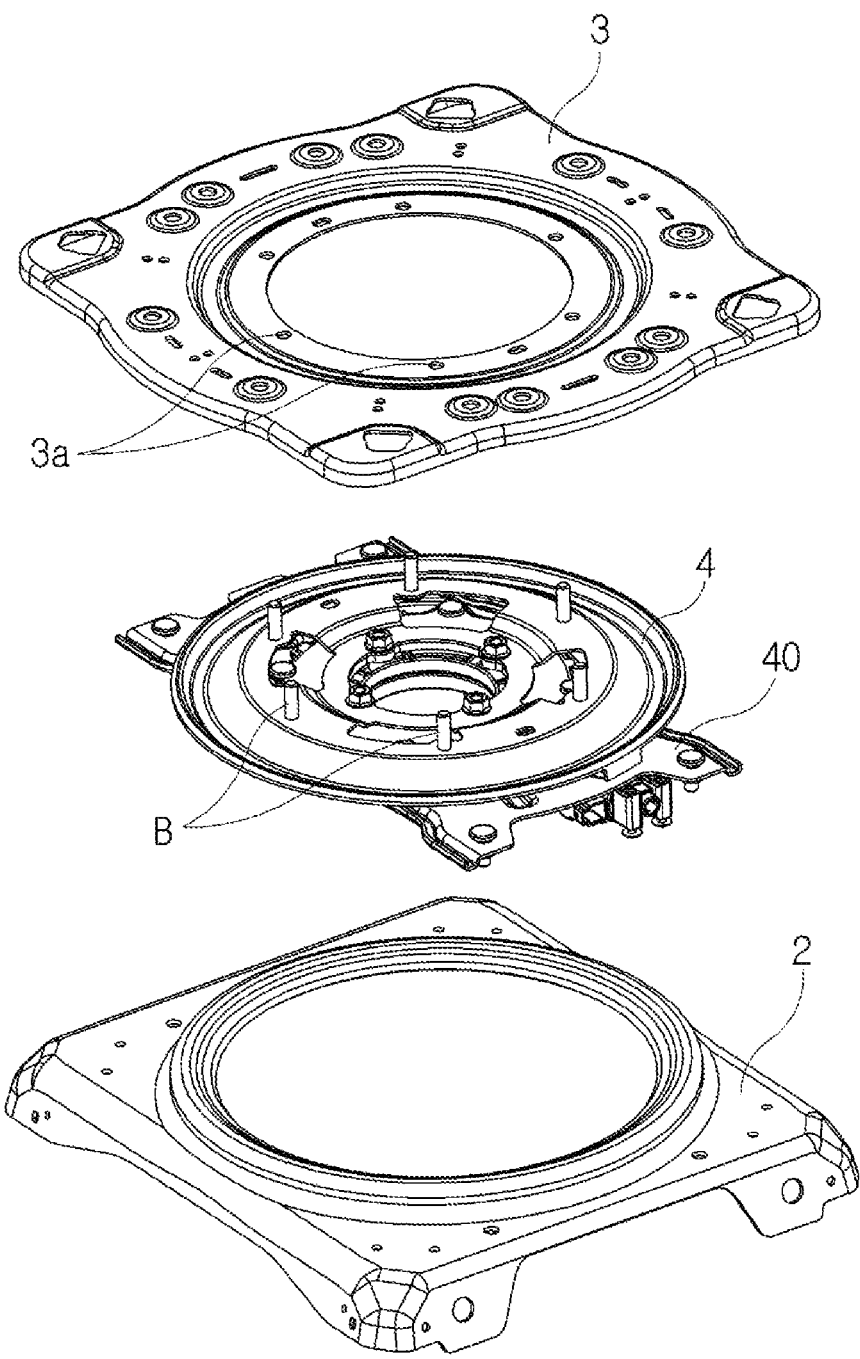
FIG. 3 is a perspective view illustrating a state in which the fixed frame, the rotating frame, and the brake unit are separated in the brake device for the power swivel seat according to the embodiment of the present disclosure.

Referring to FIGS. 1 to 3, the power swivel seat 1 to which the embodiment of the present disclosure is applied is configured to include a fixed frame 2 installed on a floor panel in a vehicle interior, and a rotating frame 3 rotatably installed with respect to the fixed frame 2, and a guide frame 4 installed between the fixed frame 2 and the rotating frame 3 so as to be interlocked with the rotating frame 3. In this case, bearing members are installed between the fixed frame 2 and the guide frame 4 and between the guide frame 4 and the rotating frame 3, respectively.

In addition, referring to FIGS. 4 to 7, the power swivel seat 1 is configured to further include a driving unit 10 installed in the fixed frame 2, a reduction unit 20 that appropriately decelerates and outputs a rotation speed by the rotation torque provided from the driving unit 10 to the outside, and a brake unit 30 that receives the rotational force of the driving unit 10 decelerated through the reduction unit 20 and restricts or allows rotation of the rotating frame 3 with respect to the fixed frame 2.

The driving unit 10 includes a drive motor 11 that rotates by operating power provided from the outside, and a worm shaft 12 that is installed on a rotation shaft of the drive motor 11 and rotates integrally therewith. In this case, the drive motor 11 is installed to make its position be fixed via a mounting bracket 40 fixed to a bottom of the fixed frame 2.

The reduction unit 20 includes a worm wheel 21 that is installed so as to be tooth-engageable with the worm shaft 12, a shaft member 22 that supports the worm wheel 21 to become rotatable, and a pinion gear 23 that is rotatably installed with respect to the shaft member 22. That is, in the reduction unit 20, the worm wheel 21 and the pinion gear 23 are installed coaxially with respect to the shaft member 22 and rotate together at the same speed.

The brake unit 30 has a structure including a reduction part, and is installed to make its position be fixed with respect to a bottom surface of the fixed frame 2 via the mounting bracket 40, and is configured to receive rotation torque decelerated through the reduction unit 20 and provided from the driving unit 10, and restrict or allow the rotation of the rotating frame 3 with respect to the fixed frame 2 via the decelerated rotation torque.

To this end, the brake unit 30 is configured to include an unlocking block 310 that receives the rotational force output from the pinion gear 23 of the reduction unit 20 to rotate, a brake wedge 320 that rotates in association with the rotation of the unlocking block 310 and forms a wedge space having an inclined structure on an outer circumferential surface thereof, and a brake ring 330 that includes an inner circumferential surface spaced apart radially outwardly to close the wedge space formed between an outer circumferential surface of the brake wedge 320 and an inner circumferential surface of the brake ring 330, and a brake roller 340 and a brake spring 350 installed in the wedge space formed between the outer circumferential surface of the brake wedge 320 and an inner circumferential surface of the brake ring 330 to enable rotation of the unlocking block 310 to be transmitted to the brake wedge 320.

The unlocking block 310 is a member that rotates by the rotational force provided from the reduction unit 20, and includes a driving gear portion 312 that is externally connected to the pinion gear 23 of the reduction unit 20 and is installed so as to be toothed, and a driving protrusion 314 that is integrally formed with the driving gear portion 312 and extends in an axial direction toward the wedge space between the brake wedge 320 and the brake ring 330.

In this case, the driving protrusion 314 is provided to be radially spaced apart with respect to a center of a member, and is provided at a position and in quantity that can be respectively matched to positions and quantity of the brake roller 340 and the brake spring 350. That is, the driving protrusion 314 is formed in plurality over the entire circumference of the outer circumferential surface of the unlocking block 310.

The brake wedge 320 is a member of the power swivel seat 1, which is connected to the rotating frame 3 that corresponds to a swivel rotating part and is rotatably installed, and in the embodiment of the present disclosure, the brake wedge 320 is configured to be connected to the rotating frame 3 through the guide frame 4.

In addition, the brake wedge 320 includes a driven protrusion 322 contactable with the driving protrusion 314 of the unlocking block 310. In this case, the driven protrusion 322 is arranged to be radially spaced apart with respect to the center of the member, and is provided at a position and in quantity that can be matched to the positions and quantity of the driving protrusion 314 of the unlocking block 310. That is, the driven protrusion 322 is formed in plurality over the entire circumference of the outer circumferential surface of the brake wedge 320.

In addition, on the outer circumferential surface of the brake wedge 320, an inclined surface portion 324 formed between the brake wedge 320 and the inner circumferential surface of the brake ring 330 is continuously provided to be in contact or non-contact with the brake roller 340 to restrict or allow rotation of the brake wedge 320. The inclined surface portion 324 provided on the outer circumferential surface of the brake wedge 320 forms a wedge space portion together with the inner circumferential surface of the brake ring 330. In this case, the inclined surface portion 324 is configured to be positioned between two mutually adjacent driven protrusions 322.

That is, the inclined surface portion 324 consists of a contact surface portion that makes contact with the brake roller 340 to restrict the rotation with respect to the brake wedge 320, and a non-contact surface that makes non-contact with the brake roller 340 to allow rotation with respect to the brake wedge 320. In this case, the contact surface portion plays a role of forcibly restricting the rotation of the brake wedge 320 between an outer circumferential surface of the inclined surface portion 324 and the inner circumferential surface of the brake ring 330 by making contact with an outer circumferential surface of the brake roller 340. In addition, the non-contact surface portion plays a role of allowing the rotation of the brake wedge 320 freely between the outer circumferential surface of the inclined surface portion 324 and the inner circumferential surface of the brake ring 330 by making non-contact with the outer circumferential surface of the brake roller 340.

In summary, the inclined surface portion 324 consists of the contact surface portion that forcibly restricts the rotation of the brake wedge 320 between the inclined surface portion 324 and the inner circumferential surface of the brake ring 330 by making contact with the outer circumferential surface of the brake roller 340, and the non-contact surface portion that freely allows the rotation of the brake wedge 320 therebetween by making non-contact with the outer circumferential surface of the brake roller 340.

Figure 4:
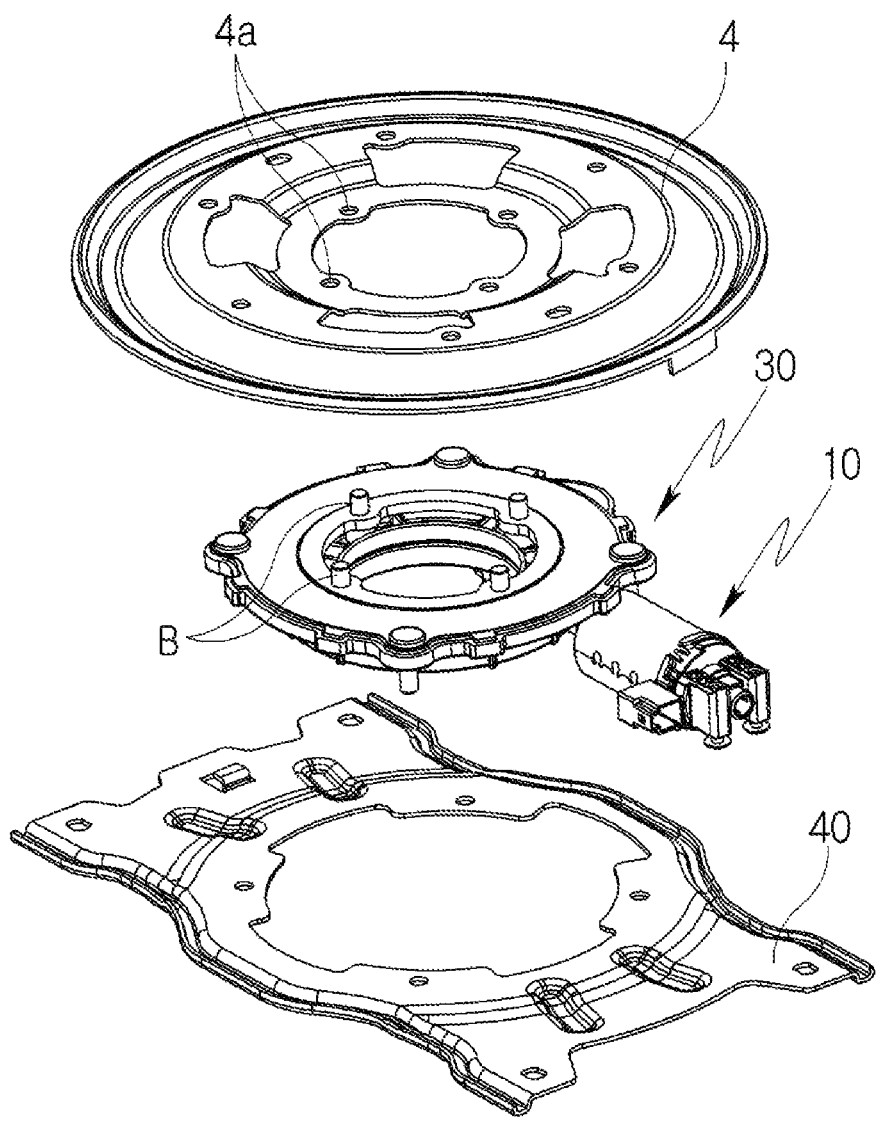
FIG. 4 is a perspective view illustrating a state in which the guide frame and the mounting bracket are separated from the brake unit of FIG. 3.
Figure 5:
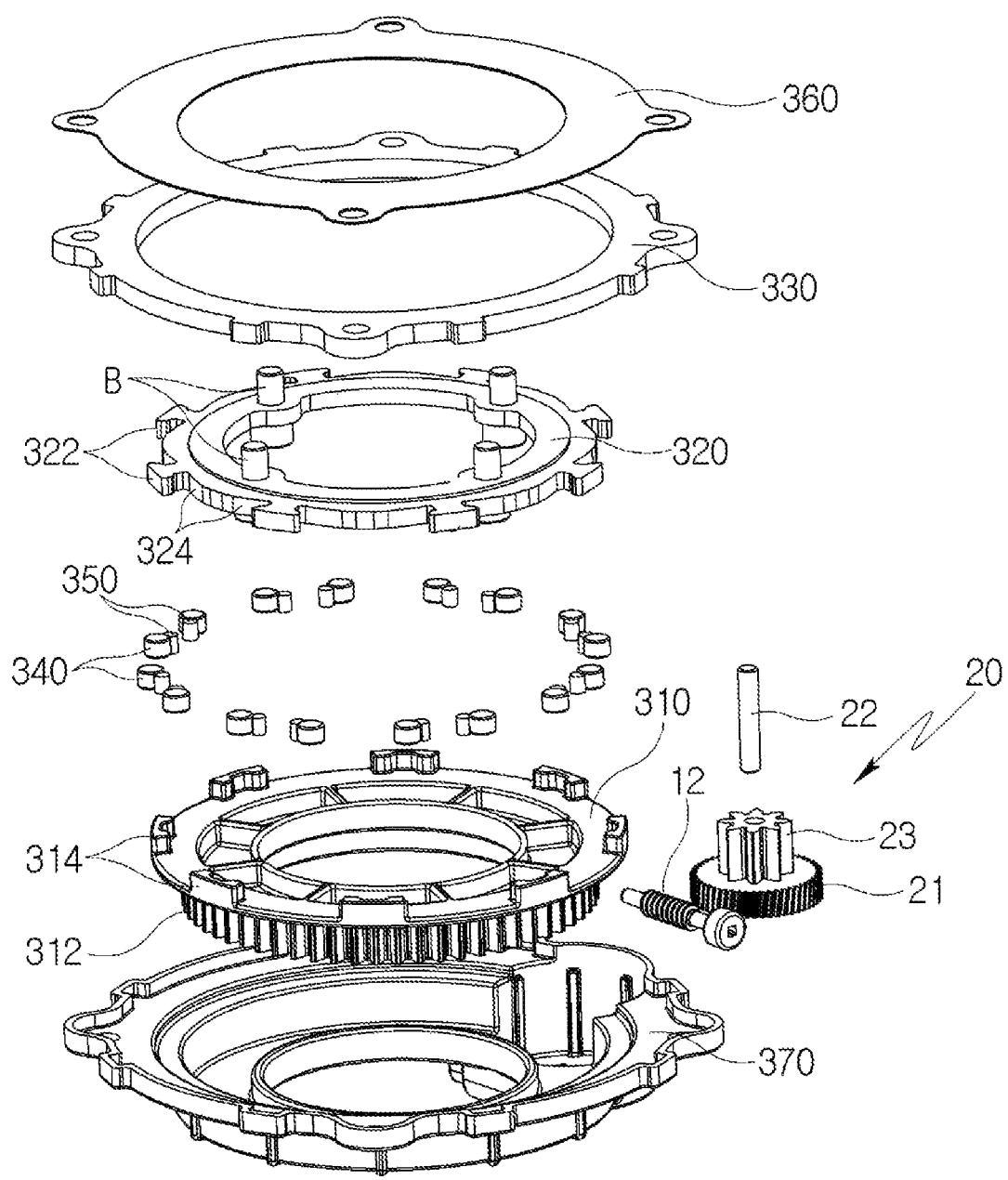
FIG. 5 is an exploded perspective view illustrating major components in order to explain a coupling relationship between components of the brake device of the power swivel seat according to the embodiment of the present disclosure.
Figure 6:
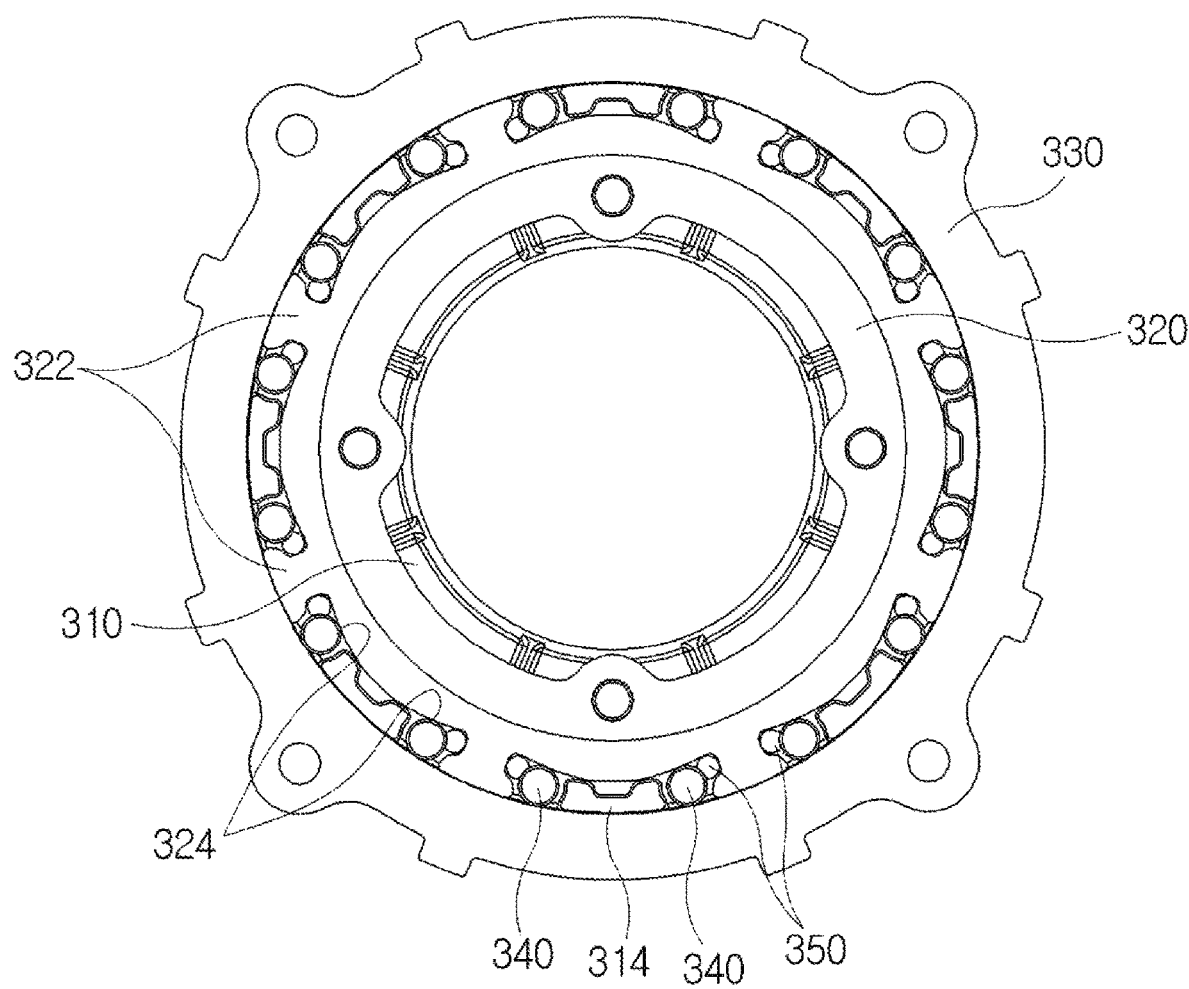
FIG. 6 is a plan view illustrating an assembly state of the brake roller and the brake spring installed in the wedge space between the brake wedge and the brake ring, which are main components in the brake device for the power swivel seat according to the embodiment of the present disclosure.
Figure 7:
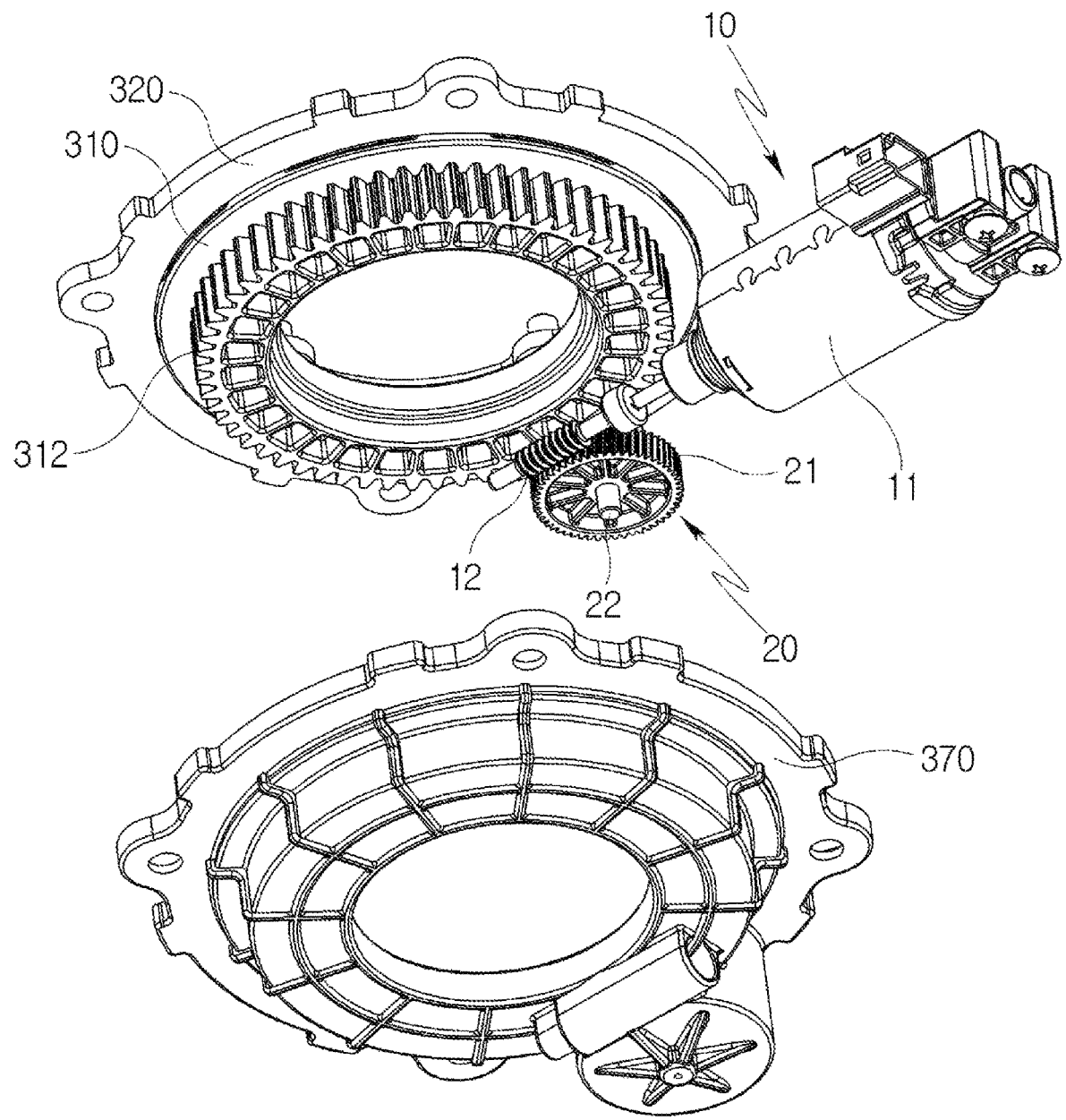
FIG. 7 is an exploded perspective view illustrating an assembly state between the brake unit and the driving unit of FIG. 4 when viewed from the bottom.

In addition, as illustrated in FIGS. 4 and 5, respectively, the brake wedge 320 is provided with a fastening bolt B inserted into a through-hole for coupling with the guide frame 4 and the guide frame 4 is provided with a through-hole 4a for screw connection by the fastening bolt. In this case, the fastening bolts B and the through-holes 4a are in plurality, respectively, and are configured to be radially spaced apart with respect to centers of the brake wedge 320 and the guide frame 4 and disposed at corresponding positions, respectively.

In addition, as illustrated in FIG. 3, the guide frame 4 is provided with the fastening bolt B being inserted into a through-hole for coupling with the rotating frame 3, and the rotating frame 3 is provided with a through-hole 3a for screw connection by the fastening bolt B. In this case, the fastening bolt B and the through-hole 3a are each in plurality, and are configured to be disposed at positions that are respectively radially spaced apart with respect to the centers of the guide frame 4 and the rotating frame 3.

The brake ring 330 is a member that is fixedly installed in the fixed frame 2 corresponding to a swivel fixing part in the power swivel seat 1, and is configured to form a wedge space between the inner circumferential surface thereof and the outer circumferential surface of the brake wedge 320.

The brake roller 340 is a member installed together with the brake spring 350 inside the wedge space located between the outer circumferential surface of the inclined surface portion 324 of the brake wedge 320 and the inner circumferential surface of the brake ring 330.

In addition, the brake roller 340 is positioned on the contact surface portion of the inclined surface portion 324 by elastic force provided from the brake spring 350 in a state in which the driving unit 10 is not operated, thereby rotation of the brake wedge 320 is constrained.

In addition, through making contact with the driving protrusion 314 of the unlocking block 310, the brake roller 340 is being compressed and moved to the non-contact surface portion of the inclined surface portion 324 in a state the driving unit 10 is operated, thereby allowing rotation of the brake wedge 320.

The brake spring 350 is a member providing elastic force to the brake roller 340 inside the wedge space positioned between the outer circumferential surface of the inclined surface portion 324 of the brake wedge 320 and the inner circumferential surface of the brake ring 330.

In this case, the brake spring 350 is configured such that one side thereof is disposed at a position making contact with the driving protrusion 314 of the unlocking block 310 and another side disposed at a position making contact with the brake roller 340 inside the wedge space.

In addition, the brake spring 350 may be made of an elastic material such as elastomer. However, it should be noted that the brake spring 350 may be a metal spring and is not limited to an elastic material such as elastomer that is elastic with regard to the material or shape of the constituent material if the brake spring 350 exemplified in the embodiment of the present disclosure can provide elastic force to the brake roller 340.

On the other hand, the cover plate 360 is separately installed on top of the brake ring 330, and the cover plate 360 plays a role of artificially limiting external deviation of the brake roller 340 and the brake spring 350 installed inside the wedge space.

In addition, since the housing 370 is separately installed below the unlocking block 310, the housing 370 plays a role of artificially limiting external deviation of the brake roller 340 and the brake spring 350 installed inside the wedge space. To this end, the housing 370 is configured to separately form spaces that can accommodate therein the worm shaft 12 forming the driving unit 10, the worm wheel 21 and the pinion gear 23 forming the reduction unit 20, and the unlocking block 310, the brake wedge 320, the brake ring 330, the brake roller 340, and the brake spring 350 forming the brake unit 30 respectively.

Therefore, in order to release lock with respect to the brake roller 340 installed in the wedge space formed between the brake wedge 320 and the brake ring 330, by applying a structure including a reduction part to the brake unit 30 configured to constrain or allow the rotational force provided from the driving unit 10 to the unlocking block 310, the brake device of the power swivel seat according to the embodiment of the present disclosure configured as described above may not only to significantly reduce the cost of manufacturing the swivel seat along with reduction of the overall weight of the swivel seat, but also to eliminate the clearance generated in the rotational direction when the swivel seat is operated.

In addition, in the embodiment of the present disclosure, since there is no clearance present in the rotational direction during operation of the swivel seat, it is possible to not only improve the stability of the operation, but also to minimize generation of operating noise.

| [REFERENCE NUMERALS] | |
| --- | --- |
| 1-POWER SWIVEL SEAT | 2-FIXED FRAME |
| 3-ROTATING FRAME | 4-GUIDE FRAME |
| 10-DRIVING UNIT | |
| 11-DRIVING MOTOR | 12-WORM SHAFT |
| 20-REDUCTION UNIT | |
| 21-WORM WHEEL | 22-SHAFT MEMBER |
| 23-PINION GEAR | |
| 30-BRAKE UNIT | 40-MOUNTING BRACKET |
| 310-UNLOCKING BLOCK | |
| 312-DRIVING GEAR PORTION | 314-DRIVING PROTRUSION |
| 320-BRAKE WEDGE | |
| 322-DRIVEN PROTRUSION | |
| 324-INCLINED SURFACE PORTION | |
| 330-BRAKE RING | 340-BRAKE ROLLER |
| 350-BRAKE SPRING | 360-COVER PLATE |
| 370-HOUSING | |

The invention claimed is:

1. A brake device of a power swivel seat, comprising:
   a brake ring connected to a swivel fixing part;
   a brake wedge connected to a swivel rotating part;
   a brake roller and a brake spring installed in a wedge space formed between an inner circumferential surface of the brake ring and an outer circumferential surface of the brake wedge; and
   an unlocking block installed to rotate the brake wedge in a direction allowing to release lock caused by the brake roller in the wedge space,
   wherein the unlocking block is provided radially with a driving protrusion extending axially toward the wedge space,
   the break wedge has a driven protrusion radially extending radially outward toward the wedge space,
   the driving protrusion is disposed between a pair of adjacent the driven protrusions,
   the brake roller and the brake spring are disposed between both sides of the driving protrusion and the driven protrusion, and
   the outer circumferential surface of the driving protrusion and the outer circumferential surface of the driven protrusion are configured to contact respectively the inner circumferential surface of the brake ring.

2. The brake device of a power swivel seat of claim 1, further comprising:
   a worm shaft receiving rotation torque from a driving motor for rotation of the unlocking block; and
   a worm wheel reducing and transferring rotational speed provided by the driving motor between the worm shaft and the unlocking block.

3. The brake device of a power swivel seat of claim 2,
   wherein the worm wheel comprises a pinion gear capable of tooth engagement with a driving gear portion of the unlocking block, and
   wherein the worm wheel and the pinion gear are installed coaxially with respect to a shaft member.

4. The brake device of a power swivel seat of claim 3,
   wherein the driving protrusion is formed integrally with the driving gear portion.

5. The brake device of a power swivel seat of claim 4,
   wherein the brake wedge is provided with an inclined surface portion formed on an outer circumferential surface thereof to be contactable with or non-contactable with the brake roller.

6. The brake device of a power swivel seat of claim 5,
   wherein the inclined surface portion comprises:
   a contact surface portion making contact with the brake roller to restrict rotation of the brake wedge; and
   a non-contact surface portion making non-contact with the brake roller to allow rotation of the brake wedge.

7. The brake device of a power swivel seat of claim 2, further comprising:
   a housing installed under the unlocking block,
   wherein the housing is configured to accommodate the worm shaft, the worm wheel, the unlocking block, the brake wedge, the brake ring, the brake roller, and the brake spring therein.

* * * * *